(12) United States Patent
Shimamoto et al.

(10) Patent No.: US 9,273,208 B2
(45) Date of Patent: Mar. 1, 2016

(54) ACRYLIC RESIN FILM

(75) Inventors: Yukihiro Shimamoto, Settsu (JP); Fujio Ishimaru, Settsu (JP); Takahiro Furo, Settsu (JP); Taizo Aoyama, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 13/985,781

(22) PCT Filed: Feb. 20, 2012

(86) PCT No.: PCT/JP2012/001120
§ 371 (c)(1),
(2), (4) Date: Oct. 25, 2013

(87) PCT Pub. No.: WO2012/114718
PCT Pub. Date: Aug. 30, 2012

(65) Prior Publication Data
US 2014/0045995 A1 Feb. 13, 2014

(30) Foreign Application Priority Data

Feb. 21, 2011 (JP) .................................. 2011-34380

(51) Int. Cl.
*C08L 79/08* (2006.01)
*C08J 5/18* (2006.01)
*C08L 51/06* (2006.01)
*C08L 51/00* (2006.01)

(52) U.S. Cl.
CPC .. *C08L 79/08* (2013.01); *C08J 5/18* (2013.01); *C08L 51/003* (2013.01); *C08L 51/06* (2013.01)

(58) Field of Classification Search
CPC .............................. C08L 79/08; C08L 51/003
See application file for complete search history.

(56) References Cited

U.S. PATENT DOCUMENTS

| | | | |
|---|---|---|---|
| 4,902,742 A | 2/1990 | Yamamoto et al. | |
| 2003/0191296 A1* | 10/2003 | Hiraide et al. | 536/7.1 |
| 2005/0096431 A1* | 5/2005 | Fujii et al. | 525/178 |
| 2008/0318072 A1* | 12/2008 | Kawabata et al. | 428/461 |
| 2009/0012215 A1* | 1/2009 | Wada et al. | 524/91 |
| 2011/0015347 A1* | 1/2011 | Hongo et al. | 525/117 |

FOREIGN PATENT DOCUMENTS

| | | |
|---|---|---|
| EP | 1 705 195 A1 | 9/2006 |
| JP | 64-75553 A | 3/1989 |
| JP | 06-011615 A | 1/1994 |
| JP | 06-256537 A | 9/1994 |
| JP | 2009-203348 A | 9/2009 |
| WO | WO 2009096374 A1 * 8/2009 | ............. C08G 59/24 |

OTHER PUBLICATIONS

International Search Report for PCT/JP2012/001120, dated Mar. 13, 2012.
European Search Report issued Aug. 1, 2014 in application No. 12749188.4-1301.

* cited by examiner

*Primary Examiner* — Mark Kaucher
(74) *Attorney, Agent, or Firm* — Sughrue Mion, PLLC

(57) ABSTRACT

Disclosed herein is an acrylic resin film having excellent heat resistance and mechanical strength, less fish-eyes, and high transparency. The acrylic resin film is obtained by molding a resin composition containing a glutarimide acrylic resin (G) and a (meth)acrylic resin (F) obtained by polymerization of a vinyl group-containing compound in the presence of alkyl acrylate-based cross-linked elastic particles having an average particle size of less than 80 nm.

7 Claims, No Drawings

ACRYLIC RESIN FILM

CROSS REFERENCE TO RELATED APPLICATIONS

This application is a National Stage of International Application No. PCT/JP2012/001120 filed Feb. 20, 2012, claiming priority based on Japanese Patent Application No. 2011-34380 filed Feb. 21, 2011, the contents of all of which are incorporated herein by reference in their entirety.

TECHNICAL FIELD

The present invention relates to an acrylic resin film having heat resistance, transparency, and flexibility.

BACKGROUND ART

Acrylic resins have excellent transparency and can be easily processed, and are therefore widely used as films, sheets, or general molded articles.

Particularly, acrylic resins having a glutaric anhydride structure or a glutarimide structural unit have excellent transparency and heat resistance and a small photoelastic constant, and therefore their use as optical materials has been studied. For example, Patent Document 1 discloses an optical film composed of a glutarimide acrylic resin. Patent Document 2 discloses a phase difference film composed of a glutarimide acrylic resin. However, a glutarimide acrylic resin generally has a problem that its mechanical strength is not always sufficient.

Various studies have been made to improve the mechanical strength of a glutarimide acrylic resin. Particularly, impact resistance is preferably improved using an impact resistance-improving agent of a type called "core-shell type", which is obtained by graft polymerization of a vinyl-based monomer onto a rubbery polymer. Specific examples of the rubbery polymer include butadiene-based rubber, acrylic rubber, and polyorganosiloxane-based rubber. However, addition of butadiene-based rubber causes a problem that the weather resistance of the resin is significantly impaired. Patent Document 3 discloses that polyorganosiloxane-based rubber is added to improve impact resistance, but this causes a problem that a resulting resin has impaired transparency.

Patent Document 4 states that a resin composition having excellent heat resistance and mechanical strength (especially, bending resistance) can be obtained by mixing a glutarimide acrylic resin and an acrylic graft copolymer.

PRIOR ART DOCUMENTS

Patent Documents

Patent Document 1: JP-A-6-256537
Patent Document 2: JP-A-6-11615
Patent Document 3: JP-A-1-75553
Patent Document 4: JP-A-2009-203348

DISCLOSURE OF THE INVENTION

Problems to be Solved by the Invention

According to a method disclosed in Patent Document 4, a film having excellent heat resistance and transparency can be obtained, but its glass transition temperature does not exceed 120° C., and therefore the heat resistance of the film needs to be further improved. Further, a transparent film obtained by the method disclosed in Patent Document 4 has a problem with quality because there is a case where microparticles called "fish-eyes" are contained in the film. In addition, there is also a case where the transparency of the film is unsatisfactory, which is also a point to be improved.

In view of the circumstances, an object of the present invention is to provide an acrylic resin film having excellent heat resistance and mechanical strength, less fish-eyes, and high transparency.

Means for Solving the Problems

In order to achieve the above object, the present inventors have intensively studied. As a result, the present inventors have found that an acrylic resin film having improved heat resistance, transparency, and flexibility and less fish-eyes can be obtained from a mixture of a (meth)acrylic resin containing alkyl acrylate-based cross-linked elastic particles having an average particle size of less than 80 nm and a glutarimide acrylic resin having high heat resistance, which has led to the completion of the present invention.

More specifically, the present invention provides an acrylic resin film obtained by molding a resin composition containing the following components (G) and (F):

a glutarimide acrylic resin (G) that contains a unit represented by the following general formula (1) and a unit represented by the following general formula (2) and has a glass transition temperature of 120° C. or higher,

[Chemical Formula 1]

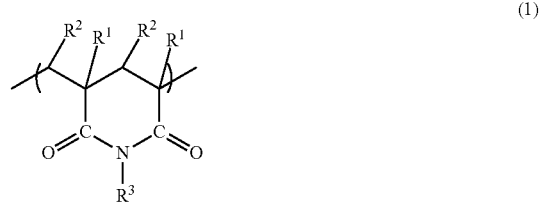

(1)

(wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or a substituent group having an aromatic ring and 5 to 15 carbon atoms)

[Chemical Formula 2]

(2)

(wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or a substituent group having an aromatic ring and 5 to 15 carbon atoms); and a (meth)acrylic resin (F) obtained by polymerization of a vinyl group-containing compound in the presence of alkyl acrylate-based cross-linked elastic particles having an average particle size of less than 80 nm and obtained by copolymerization of alkyl acrylate and another vinyl monomer copolymerizable therewith.

In the present invention, it is preferred that the glutarimide acrylic resin (G) does not contain a unit represented by the following general formula (3):

[Chemical Formula 3]

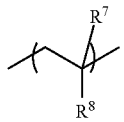

(3)

(wherein $R^7$ is hydrogen or an alkyl group having 1 to 8 carbon atoms and $R^8$ is an aryl group having 6 to 10 carbon atoms).

In the present invention, it is preferred that, when an amount of the resin composition is taken as 100 wt %, an amount of the alkyl acrylate-based cross-linked elastic particles contained in the resin composition is 5 to 40 wt %.

In the present invention, it is preferred that, when an amount of the resin composition is taken as 100 wt %, amounts of the glutarimide acrylic resin (G) and the (meth) acrylic resin (F) contained in the resin composition are 40 to 90 wt % and 60 to 10 wt %, respectively.

In the present invention, it is preferred that the (meth) acrylic resin (F) is obtained by polymerization of a monomer mixture (E) containing 60 to 100 wt % of alkyl methacrylate and 0 to 40 wt % of alkyl acrylate in the presence of alkyl acrylate-based cross-linked elastic particles (B) having an average particle size of less than 80 nm and obtained by copolymerization of 100 parts by weight of a monomer mixture containing 50 to 100 wt % of alkyl acrylate and 50 to 0 wt % of alkyl methacrylate and 0.5 to 5 parts by weight of a polyfunctional monomer having two or more non-conjugated double bonds per molecule.

In the present invention, it is preferred that the (meth) acrylic resin (F) is obtained by polymerization of a monomer mixture (E) containing more than 10 wt % but 35 wt % or less of unsaturated carboxylic acid, 50 wt % or more but less than 90 wt % of alkyl methacrylate and 0 wt % or more but less than 40 wt % of alkyl acrylate in the presence of alkyl acrylate-based cross-linked elastic particles (B) having an average particle size of less than 80 nm and obtained by copolymerization of 100 parts by weight of a monomer mixture containing 50 to 100 wt % of alkyl acrylate and 50 to 0 wt % of alkyl methacrylate and 0.5 to 5 parts by weight of a polyfunctional monomer having two or more non-conjugated double bonds per molecule, and that an amount of the alkyl acrylate-based cross-linked elastic particles (B) contained in the (meth) acrylic resin (F) is more than 30 wt % but 60 wt % or less.

In the present invention, it is preferred that the acrylic resin film has a glass transition temperature of 115° C. or higher, a haze value of 1.0% or less, and a thickness of 300 μm or less.

The present invention also provides an optical film comprising the acrylic resin film.

Effects of the Invention

The acrylic resin film according to the present invention has excellent heat resistance, transparency, and flexibility while maintaining excellent appearance with less fish-eyes. Further, the acrylic resin film according to the present invention also has excellent stretchability and vacuum moldability.

PREFERRED MODE FOR CARRYING OUT THE INVENTION

Hereinbelow, embodiments of the present invention will be described in detail. However, the present invention is not limited to these embodiments.

(Glutarimide Acrylic Resin (G))

A glutarimide acrylic resin (G) has a glass transition temperature of 120° C. or higher and contains a unit represented by the following general formula (1) and a unit represented by the following general formula (2).

[Chemical Formula 4]

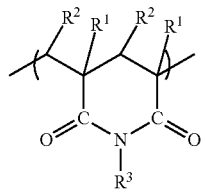

(1)

In the above general formula (1), $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (1) is also referred to as "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R'$, $R^2$, and $R^3$ are more preferably a methyl group, hydrogen, and a methyl group, respectively.

The glutarimide acrylic resin (G) may contain only one kind of glutarimide unit or may contain two or more kinds of glutarimide units between which any one of $R'$, $R^2$, and $R^3$ in the above general formula (1) is different or all of them are different.

The glutarimide unit can be formed by imidizing a (meth) acrylate ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin (G) is not particularly limited, and can be appropriately determined in consideration of, for example, the structure of $R^3$. However, the glutarimide unit content is preferably 1.0 wt % or more, more preferably 3.0 wt % to 90 wt %, even more preferably 5.0 wt % to 60 wt % with respect to the total weight of the glutarimide acrylic resin (G). If the glutarimide unit content is less than the above lower limit, the resulting glutarimide acrylic resin (G) tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength when a resulting film is processed, or impair transparency.

The glutarimide unit content is calculated in the following manner.

The resin is subjected to $^1$H-NMR analysis using $^1$H-NMR BRUKER AvanceIII (400 MHz) to determine the amount of each monomer unit, such as a glutarimide unit or an ester unit, contained in the resin (mol %), and the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, the glutarimide unit content (wt %) of the resin can be determined from the following calculation formula using the area a of a peak derived from protons of O—$CH_3$ of methyl methacrylate and appearing at around 3.5 to 3.8 ppm and the area b of a peak derived from protons of N—$CH_3$ of glutarimide and appearing at around 3.0 to 3.3 ppm.

[Methyl methacrylate unit content $A$ (mol %)]=100×$a$/($a+b$)

[Glutarimide unit content $B$ (mol %)]=100×$b$/($a+b$)

[Glutarimide unit content (wt %)]=100×($b$×(molecular weight of glutarimide unit))/($a$×(molecular weight of methyl methacrylate unit)+$b$×(molecular weight of glutarimide unit))

It is to be noted that even if the resin contains a monomer unit other than the above units, the glutarimide unit content (wt %) can be determined in the same manner as described above from the amount of each monomer unit contained in the resin (mol %) and the molecular weight of each monomer unit.

When an acrylic resin film according to the present invention is intended to be used as, for example, a polarizer protective film, the glutarimide unit content is preferably 20 wt % or less, more preferably 15 wt % or less, even more preferably 10 wt % or less because birefringence is likely to be suppressed.

When an acrylic resin film according to the present invention is intended to be used as, for example, a phase difference film, the glutarimide unit content is preferably 50 wt % or more, more preferably 70 wt % or more because a phase difference is likely to occur.

[Chemical formula 5]

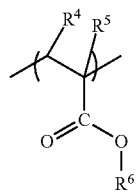

(2)

In the above general formula (2), $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (2) is also referred to as "(meth)acrylate ester unit".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin (G) may contain only one kind of (meth)acrylate ester unit or may contain two or more kinds of (meth)acrylate ester units between which any one of $R^4$, $R^5$, and $R^6$ in the above general formula (2) is different or all of them are different.

If necessary, the glutarimide acrylic resin (G) may further contain a unit represented by the following general formula (3) (hereinafter, also referred to as "aromatic vinyl unit").

[Chemical formula 6]

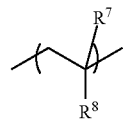

(3)

In the above general formula (3), $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and α-methylstyrene unit. The aromatic vinyl unit is preferably a styrene unit.

The glutarimide acrylic resin (G) may contain only one kind of aromatic vinyl unit and may contain two or more aromatic vinyl units between which one of $R^7$ and $R^8$ is different or both of them are different.

The aromatic vinyl unit content of the glutarimide acrylic resin (G) is not particularly limited, but is preferably 0 to 50 wt %, more preferably 0 to 20 wt %, particularly preferably 0 to 15 wt % with respect to the total weight of the glutarimide acrylic resin (G). If the aromatic vinyl unit content exceeds the above upper limit, the glutarimide acrylic resin (G) cannot have sufficient heat resistance.

However, in the present invention, the glutarimide acrylic resin (G) preferably contains no aromatic vinyl unit from the viewpoint of improving bending resistance and transparency, reducing fish-eyes, and improving solvent resistance or weather resistance.

If necessary, the glutarimide acrylic resin (G) may further contain another unit other than the glutarimide unit, the (meth)acrylate ester unit, and the aromatic vinyl unit.

Examples of the another unit include amide-based units such as acrylamide and methacrylamide, a glutaric anhydride unit, nitrile-based units such as acrylonitrile and methacrylonitrile, and maleimide-based units such as maleimide, N-methylmaleimide, N-phenylmaleimide, and N-cyclohexyl maleimide.

The another unit may be incorporated into the glutarimide acrylic resin (G) by random copolymerization or graft copolymerization.

The another unit may be incorporated into the glutarimide acrylic resin (G) by copolymerization of a monomer constituting the another unit and the glutarimide acrylic resin (G) and/or a resin used as a raw material for producing the resin (G). The another unit incorporated into the resin (G) may be a by-product of the above-described imidization reaction.

The weight-average molecular weight of the glutarimide acrylic resin (G) is not particularly limited, but is preferably in the range of $1\times10^4$ to $5\times10^5$. By setting the weight-average molecular weight of the glutarimide acrylic resin (G) to a value within the above range, it is possible to prevent deterioration in molding processability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, molding processability tends to be deteriorated, and molded article productivity tends to be reduced.

The glass transition temperature of the glutarimide acrylic resin (G) is 120° C. or higher so that a resulting film can have excellent heat resistance. The glass transition temperature of the glutarimide acrylic resin (G) is preferably 125° C. or higher. If the glass transition temperature of the glutarimide acrylic resin (G) is less than the above lower limit, a resulting film cannot have sufficient heat resistance.

Hereinbelow, one example of a method for producing a glutarimide acrylic resin (G) will be described.

First, a (meth)acrylate polymer is produced by polymerization of (meth)acrylate ester. When a glutarimide acrylic resin (G) containing an aromatic vinyl unit is to be produced, a (meth)acrylate-aromatic vinyl copolymer is first produced by copolymerization of (meth)acrylate ester and an aromatic vinyl compound.

The (meth)acrylate ester used in this step is preferably, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylate esters may be used singly or in combination of two or more of them. The use of two or more kinds of (meth)acrylate esters makes it possible to finally obtain a glutarimide acrylic resin (G) containing two or more kinds of (meth)acrylate ester units.

The structure of the (meth)acrylate polymer or the (meth)acrylate-aromatic vinyl copolymer is not particularly limited as long as a subsequent imidization reaction can be carried out. More specifically, the (meth)acrylate polymer or the (meth)acrylate-aromatic vinyl copolymer may be a linear polymer, a block polymer, a core-shell polymer, a branched polymer, a ladder polymer, a cross-linked polymer, or the like.

In the case of a block polymer, the block polymer may be any one of an A-B-type block polymer, an A-B-C-type block polymer, an A-B-A-type block polymer, and another type of block polymer. In the case of a core-shell polymer, the core-shell polymer may be one composed of only one core layer and one shell layer or one whose core and/or shell are/is multi-layered.

Then, the (meth)acrylate polymer or the (meth)acrylate-aromatic vinyl copolymer is reacted with an imidization agent to carry out an imidization reaction. In this way, a glutarimide acrylic resin (G) can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethylurea, 1,3-diethylurea, and 1,3-dipropylurea.

Among these imidization agents, ammonia, methylamine, and cyclohexylamine are preferably used, and methylamine is particularly preferably used from the viewpoint of cost and physical properties.

In the imidization step, a ring-closing promoter may be added in addition to the imidization agent, if necessary.

In the imidization step, the glutarimide unit content of a resulting glutarimide acrylic resin (G) can be adjusted by adjusting the ratio of the imidization agent added.

A method for carrying out the imidization reaction is not particularly limited, and a well-known conventional method can be used. For example, the imidization reaction is allowed to proceed by using an extruder or a batch-type reactor (pressure vessel).

The extruder is not particularly limited, and various extruders, such as a single screw extruder, a twin screw extruder, and a multi-screw extruder, can be used.

Among them, a twin screw extruder is preferably used. The use of a twin screw extruder makes it possible to promote mixing of the raw material polymer and the imidization agent (or, when a ring-closing promoter is used, mixing of the raw material polymer, the imidization agent, and the ring-closing promoter).

Examples of the twin screw extruder include a non-intermeshing co-rotating twin screw extruder, an intermeshing co-rotating twin screw extruder, a non-intermeshing counter-rotating twin screw extruder, and an intermeshing counter-rotating twin screw extruder. Among them, an intermeshing co-rotating twin screw extruder is preferred. The screws of an intermeshing co-rotating twin screw extruder can rotate at high speed, and therefore mixing of the raw material polymer and the imidization agent (or, when a ring-closing promoter is used, mixing of the raw material polymer, the imidization agent, and the ring-closing promoter) can be further promoted.

The above-mentioned extruders may be used singly or in combination of two or more of them connected in series.

The glutarimide acrylic resin (G) production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin (G) to a value within a desired range.

The acid value of the glutarimide acrylic resin (G) is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin (G) can offer an excellent balance of heat resistance, mechanical properties, and molding processability. On the other hand, if the acid value exceeds the above upper limit, foaming of the resin is likely to occur during melt extrusion for film formation, which tends to deteriorate molding processability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluenesulfonate, methyl trifluoromethylsulfonate, methyl acetate, methanol, ethanol, methyl isocyanate, p-chlorophenyl isocyanate, dimethylcarbodiimide, dimethyl-t-butylsilylchloride, isopropenyl acetate, dimethylurea, tetramethylammonium hydroxide, dimethyl diethoxysilane, tetra-N-butoxysilane, dimethyl(trimethylsilane) phosphite, trimethyl phosphite, trimethyl phosphate, tricresyl phosphate, diazomethane, ethylene oxide, propylene oxide, cyclohexene oxide, 2-ethylhexylglycidyl ether, phenyl glycidyl ether, and benzyl glycidyl ether. Among them, dimethyl carbonate and trimethyl orthoacetate are preferred from the viewpoint of cost, reactivity and the like, and dimethyl carbonate is particularly preferred from the viewpoint of cost.

The amount of the esterification agent used is not particularly limited, but is preferably 0 to 12 parts by weight, more preferably 0 to 8 parts by weight with respect to 100 parts by weight of the (meth)acrylate polymer or the (meth)acrylate-aromatic vinyl copolymer. By setting the amount of the esterification agent used to a value within the above range, the acid value of the glutarimide acrylic resin (G) can be adjusted to a value within an appropriate range. On the other hand, if the amount of the esterification agent used falls outside the above range, there is a possibility that part of the esterification agent will remain unreacted in the resin, in which case the unreacted esterification agent will become a cause of foaming or odor generation when molding is performed using the resin.

A catalyst may be used in combination with the esterification agent. The type of catalyst to be used is not particularly limited, and examples of the catalyst include aliphatic tertiary amines such as trimethylamine, triethylamine, or tributylamine. Among them, triethylamine is preferred from the viewpoint of cost, reactivity and the like.

As in the case of the imidization step, the esterification step is allowed to proceed by using, for example, an extruder or a batch-type reactor.

The esterification step may be performed only by heat treatment without using the esterification agent. The heat treatment can be achieved by kneading and dispersing the melted resin in an extruder. When the esterification step is performed only by heat treatment, some or all of carboxyl groups produced as a by-product in the imidization step can be converted to acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may be used.

Even when the esterification step is performed using the esterification agent, conversion to acid anhydride groups by heat treatment can be allowed to proceed in parallel. In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin (G) can also be appropriately produced using, instead of an extruder, a high-viscosity reaction apparatus such as a horizontal twin screw reaction apparatus such as BIVOLAK manufactured by Sumitomo Heavy Industries, Ltd. or a vertical twin screw mixing vessel such as SUPER BLEND.

When the glutarimide acrylic resin (G) is produced using a batch-type reactor (pressure vessel), the structure of the batch-type reactor (pressure vessel) is not particularly limited. More specifically, the batch-type reactor should have a structure in which the raw material polymer can be melted by heating and stirred and the imidization agent (or, when a ring-closing promoter is used, the imidization agent and the ring-closing promoter) can be added, and preferably has a structure excellent in stirring efficiency. The use of such a batch-type reactor can prevent insufficient stirring due to an increase in the viscosity of the polymer with the progress of the reaction. Examples of a batch-type reactor having such a structure include a mixing vessel MAX BLEND manufactured by Sumitomo Heavy Industries, Ltd.

In such a way as described above, a glutarimide acrylic resin (G) whose glutarimide unit content is controlled to a specific value can be easily produced.

((Meth)Acrylic Resin (F))

A (meth)acrylic resin (F) has a multi-layered structure and is obtained by polymerization of a monomer mixture (E) in the presence of alkyl acrylate-based cross-linked elastic particles (B) having an average particle size of less than 80 nm and obtained by copolymerization of alkyl acrylate and another vinyl monomer copolymerizable therewith.

The alkyl acrylate-based cross-linked elastic particles (B) are preferably obtained by copolymerization of 100 parts by weight of a monomer mixture (b) containing 50 to 100 wt % of alkyl acrylate and 0 to 50 wt % of alkyl methacrylate and 0.5 to 5 parts by weight of a polyfunctional monomer having two or more non-conjugated double bonds per molecule. The copolymerization may be performed in one step or in multiple steps. In the latter case, the composition of the monomer mixture added in each step or reaction conditions in each step may be changed, if necessary. The monomer mixture (b) more preferably contains 60 to 100 wt % of alkyl acrylate and 0 to 40 wt % of alkyl methacrylate when the amount of the monomer mixture (b) is taken as 100 wt %. If the mixing ratio of the alkyl methacrylate in the monomer mixture (b) exceeds 50 wt %, a resulting film tends to have reduced bending resistance.

The alkyl acrylate and the alkyl methacrylate contained in the monomer mixture (b) are not particularly limited, but preferably have an alkyl group having 1 to 12 carbon atoms from the viewpoint of polymerization reactivity and cost. Specific examples of them include methyl methacrylate, ethyl methacrylate, propyl methacrylate, n-butyl methacrylate, methyl acrylate, and n-butyl acrylate. These monomers may be used singly or in combination of two or more of them.

If necessary, the monomer mixture (b) may contain another ethylenic unsaturated monomer copolymerizable with the alkyl acrylate and the methacrylate. Examples of the another copolymerizable ethylenic unsaturated monomer include: vinyl halides such as vinyl chloride and vinyl bromide; vinyl cyanides such as acrylonitrile and methacrylonitrile; aromatic vinyl compounds such as vinyl toluene, vinyl naphthalene, styrene, and α-methylstyrene; vinyl esters such as vinyl formate, vinyl acetate, and vinyl propionate; vinylidene halides such as vinylidene chloride and vinylidene fluoride; acrylic acid and salts thereof such as acrylic acid, sodium acrylate and calcium acrylate; alkyl acrylate derivatives such as β-hydroxyethyl acrylate, dimethylaminoethyl acrylate, glycidyl acrylate, acrylamide, and N-methylol acrylamide; methacrylic acid and salts thereof such as methacrylic acid, sodium methacrylate and calcium methacrylate; and alkyl methacrylate derivatives such as methacrylamide, β-hydroxyethyl methacrylate, dimethylaminoethyl methacrylate, and glycidyl methacrylate. These monomers may be used singly or in combination of two or more of them.

The alkyl acrylate-based cross-linked elastic particles (B) used in the present invention exhibit elasticity due to cross-linking because they are obtained by copolymerization of a monomer mixture (b) and a polyfunctional monomer having two or more polymerizable non-conjugated double bonds per molecule (hereinafter, also referred to as "polyfunctional monomer"). Further, during the polymerization of the monomer mixture (E) in the presence of the alkyl acrylate-based cross-linked elastic particles (B), one of the double bonds of the polyfunctional monomer remaining unreacted after the production of the particles (B) becomes a graft cross-linking point, and therefore part of the monomer mixture (E) can be grafted onto the alkyl acrylate-based cross-linked elastic particles (B).

The polyfunctional monomer used in the present invention is not particularly limited, and examples thereof include allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used singly or in combination of two or more of them.

The amount of the polyfunctional monomer used is preferably 0.5 to 5 parts by weight, more preferably 1.0 to 4 parts by weight with respect to 100 parts by weight of the monomer mixture (b). The amount of the polyfunctional monomer used within the above range is preferred in that a resulting film has excellent bending resistance and a resulting resin has excellent fluidity.

In the present invention, the alkyl acrylate-based cross-linked elastic particles (B) have an average particle size of less than 80 nm. If the average particle size is 80 nm or more, a resulting transparent film may contain microparticles called "fish-eyes" regarded as a film defect. However, by setting the average particle size to a value less than 80 nm, such a problem can be solved. Further, also from the viewpoint of bending resistance and anti-whitening on bending, the average particle size is preferably less than 80 nm. The lower limit of the average particle size is not particularly limited. However, too small an average particle size makes it difficult to produce the particles (B), and therefore the lower limit of the average particle size is preferably 40 nm or more, more preferably 50 nm or more, even more preferably 60 nm or more. The average particle size of the particles (B) is measured by a light-scattering method using a particle size analyzer (MICROTRAC UPA150 manufactured by LEED & NORTHRUP INSTRUMENT).

The (meth)acrylic resin (F) is preferably obtained by polymerization of a monomer mixture (E) mainly containing a vinyl group-containing compound, especially alkyl methacrylate, in the presence of the above-described alkyl acrylate-based cross-linked elastic particles (B).

The monomer mixture (E) preferably contains 60 to 100 wt % of alkyl methacrylate and 0 to 40 wt % of alkyl acrylate. The polymerization may be performed in one step or in multiple steps. In the latter case, the composition of the monomer mixture added in each step or reaction conditions in each step may be changed, if necessary. The monomer mixture (E) more preferably contains 70 to 100 wt % of alkyl methacrylate and 0 to 30 wt % of alkyl acrylate when the amount of the monomer mixture (E) is taken as 100 wt %. If the mixing ratio of the alkyl methacrylate in the monomer mixture (E) is less than 60 wt %, a resulting film tends to have reduced heat resistance.

The alkyl acrylate and the alkyl methacrylate contained in the monomer mixture (E) are not particularly limited, but preferably have an alkyl group having 1 to 12 carbon atoms from the viewpoint of polymerization reactivity and cost. Specific examples of them include methyl methacrylate, ethyl methacrylate, propyl methacrylate, n-butyl methacrylate, methyl acrylate, and n-butyl acrylate. These monomers may be used singly or in combination of two or more of them.

The monomer mixture (E) preferably contains more than 10 wt % but 35 wt % or less of unsaturated carboxylic acid, 50 wt % or more but less than 90 wt % of alkyl methacrylate, and 0 wt % or more but less than 40 wt % of alkyl acrylate. Here, the total amount of the unsaturated carboxylic acid, the alkyl methacrylate, and the alkyl acrylate is taken as 100 wt %.

In the present invention, since the monomer mixture (E) contains a specific amount of unsaturated carboxylic acid, a resulting film can have heat resistance while maintaining excellent transparency and flexibility. If the amount of unsaturated carboxylic acid used is 10 wt % or less, a resulting film tends to have reduced heat resistance. The use of more than 10 wt % of unsaturated carboxylic acid makes it possible to enhance adhesiveness of a resulting film according to the present invention to a metal at the time when the metal is evaporated onto the surface of the film. Such a film whose surface is coated with a metal by evaporation can be used as, for example, a substitute for plating on cars and the like.

The unsaturated carboxylic acid is copolymerizable with the alkyl methacrylate, and may be, for example, acrylic acid or methacrylic acid.

As the alkyl methacrylate and the alkyl acrylate contained in the monomer mixture (E), the above-mentioned alkyl methacrylate and alkyl acrylate can be used.

If necessary, the monomer mixture (E) may contain another ethylenic unsaturated monomer copolymerizable with the alkyl acrylate and the methacrylate. Examples of the another copolymerizable ethylenic unsaturated monomer include: vinyl halides such as vinyl chloride and vinyl bromide; vinyl cyanides such as acrylonitrile and methacrylonitrile; aromatic vinyl compounds such as vinyl toluene, vinyl naphthalene, styrene, and α-methylstyrene; vinyl esters such as vinyl formate, vinyl acetate, and vinyl propionate; vinylidene halides such as vinylidene chloride and vinylidene fluoride; acrylic acid and salts thereof such as acrylic acid, sodium acrylate and calcium acrylate; alkyl acrylate derivatives such as β-hydroxyethyl acrylate, dimethylaminoethyl acrylate, glycidyl acrylate, acrylamide, and N-methylol acrylamide; methacrylic acid and salts thereof such as methacrylic acid, sodium methacrylate and calcium methacrylate; and alkyl methacrylate derivatives such as methacrylamide, β-hydroxyethyl methacrylate, dimethylaminoethyl methacrylate, and glycidyl methacrylate. These monomers may be used singly or in combination of two or more of them.

The amount of the alkyl acrylate-based cross-linked elastic particles (B) contained in the (meth)acrylic resin (F) is preferably more than 30 wt % but 60 wt % or less, more preferably 35 wt % or more but 55 wt % or less when the total amount of the (meth)acrylic resin (F) is taken as 100 wt %. The alkyl acrylate-based cross-linked elastic particle (B) content within the above range is preferred in that a latex becomes stable during emulsion polymerization of the monomer mixture (E) containing unsaturated carboxylic acid.

The amount of the alkyl acrylate-based cross-linked elastic particles contained in a resin composition used in the present invention is preferably 5 to 40 wt %, more preferably 5 to 35 wt % when the amount of the resin composition is taken as 100 wt %. If the alkyl acrylate-based cross-linked elastic particle content is less than 5 wt %, a resulting film tends to have reduced bending resistance and vacuum moldability, and if the alkyl acrylate-based cross-linked elastic particle content exceeds 40 wt %, a resulting film tends to have reduced heat resistance.

The glutarimide acrylic resin (G) content and the (meth) acrylic resin (F) content of a resin composition used in the present invention are preferably 40 wt % to 90 wt % and 60 wt % to 10 wt %, respectively, more preferably 40 wt % to 85 wt % and 60 wt % to 15 wt %, respectively when the amount of the resin composition is taken as 100 wt %. By setting the resin (G) content to 40 wt % or more, a resulting film has improved heat resistance and transparency. By setting the resin (G) content to 90 wt % or less, a resulting film has improved flexibility.

The resin composition constituting an acrylic resin film according to the present invention may contain another resin such as, for example, a methacrylic resin having a lactone ring structure, a (meth)acrylic resin, a styrene-based resin, a methyl methacrylate-styrene copolymer, a polyethylene terephthalate resin, or a polybutylene terephthalate resin.

If necessary, the resin composition constituting an acrylic resin film according to the present invention may contain any well-known additive such as a light stabilizer, a UV absorber, a heat stabilizer, a delustering agent, a light diffusing agent, a coloring agent, a dye, a pigment, an antistatic agent, a heat reflecting agent, a lubricant, a plasticizer, a UV absorber, a stabilizer, or a filler.

The acrylic resin film according to the present invention can be used for various purposes for its properties such as heat resistance, transparency, and flexibility. More specifically, the acrylic resin film can be used for interior and exterior of cars, personal computers, mobile devices, and solar batteries; solar battery backsheets; taking lenses for cameras, VTRs, and projectors, finders, filters, prisms, Fresnel lenses and the like for use in the field of imaging; lenses such as pick-up lenses for optical disc in CD players, DVD players, MD players and the like; optical discs such as CDs, DVDs, and MDs for use in the field of optical recording; films for liquid crystal displays such as light guide plates, diffuser panels, backsheets, reflection sheets, polarizer protective films, and phase difference films and surface protective films for use in the field of information devices; optical fibers, optical switches, optical connectors and the like for use in the field of optical communications; car headlights, tail lamp lenses, inner lenses, instrument covers, sunroofs and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials and the like for use in the fields of architecture and construction materials; microwave cooking vessels (dishes); housings for home appliances; toys; sunglasses; and stationery, etc. The acrylic resin film according to the present invention can be used also as a substitute for a molded article using a transfer foil sheet.

A molded article produced by molding the acrylic resin film according to the present invention can also be used for various purposes. More specifically, the molded article can be used for interior and exterior of cars, personal computers, mobile devices, and solar batteries; solar battery backsheets; taking lenses for cameras, VTRs, and projectors, finders, filters, prisms, Fresnel lenses and the like for use in the field of imaging; lenses such as pick-up lenses for optical disc in CD players, DVD players, MD players and the like; optical discs such as CDs, DVDs, and MDs for use in the field of optical recording; touch panels, flexible image display devices, electronic paper, films for liquid crystal displays such as light guide plates, diffuser panels, backsheets, reflection sheets, polarizer protective films, and phase difference films, and surface protective films for use in the field of information devices; optical fibers, optical switches, optical connectors and the like for use in the field of optical communications; car headlights, tail lamp lenses, inner lenses, instrument covers, sunroofs and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials and the like for use in the fields of architecture and construction materials; microwave cooking vessels (dishes); housings for home appliances; toys; sunglasses; and stationery, etc.

The acrylic resin film according to the present invention can be stretched, which makes it possible to improve strength and film thickness accuracy. When the acrylic resin film according to the present invention is stretched, a resulting stretched film may be a uniaxially-stretched film obtained by uniaxial stretching or a biaxially-stretched film obtained by a combination of stretching processes.

As a method for forming the acrylic resin film according to the present invention, a melt extrusion method using no solvent is preferred from the viewpoint of the transparency of a resulting film, production cost, and avoidance of use of solvent.

If necessary, the acrylic resin film according to the present invention may be subjected to surface treatment. For example, when the acrylic resin film according to the present invention is to be subjected to surface processing such as coating processing or to be laminated on another film before use, the acrylic resin film according to the present invention is preferably subjected to surface treatment. By subjecting the acrylic resin film according to the present invention to surface treatment, it is possible to enhance adhesiveness of the acrylic resin film according to the present invention to a coating material or another film to be laminated.

It is to be noted that the purpose of surface treatment of the acrylic resin film according to the present invention is not limited to the above. The acrylic resin film according to the present invention may be subjected to surface treatment irrespective of its intended use. The surface treatment is not particularly limited, and may be, for example, corona treatment, plasma treatment, UV irradiation treatment, or alkali treatment. Among them, corona treatment is preferred.

The thickness of the acrylic resin film according to the present invention is not particularly limited, but is preferably 300 μm or less, more preferably 10 to 300 μm, even more preferably 15 to 200 μm, particularly preferably 20 to 200 μm. When the film thickness is within the above range, there is an advantage that, when vacuum molding is performed using the film, deformation is less likely to occur and a deep-drawn portion is less likely to be broken, and the film can have uniform optical characteristics and excellent transparency. On the other hand, if the film thickness exceeds the above upper limit, the film is non-uniformly cooled after film formation and therefore tends to have non-uniform optical characteristics. If the film thickness is less than the above lower limit, there is a case where the film is difficult to be handled.

The acrylic resin film according to the present invention preferably has a haze value of 1.0% or less, particularly preferably 0.8% or less. When the haze value of the acrylic resin film according to the present invention is within the above range, the film can have sufficiently high transparency.

Therefore, the acrylic resin film according to the present invention is suitable for optics applications, decorative applications, and interior applications requiring transparency or for vacuum molding.

The acrylic resin film according to the present invention preferably has a glass transition temperature of 115° C. or higher, more preferably 120° C. or higher, even more preferably 124° C. or higher. When the glass transition temperature is within the above range, the acrylic resin film can have sufficiently high heat resistance.

The acrylic resin film according to the present invention preferably has a tensile elongation at breakage of 10% or more. The acrylic resin film according to the present invention having a tensile elongation at breakage within the above range is preferred because cracks are less likely to be produced when the film is cut out using a Thomson blade or a cutter blade and the film is less likely to be broken when wound into a roll or when its surface is subjected to post-processing such as coating, vapor deposition, sputtering, or bonding with a protective film.

The acrylic resin film according to the present invention preferably has a total light transmittance of 85% or higher, more preferably 88% or higher. When the total light transmittance of the film is within the above range, the film can have sufficiently high transparency. Therefore, the acrylic resin film according to the present invention is suitable for optics applications, decorative applications, and interior applications requiring transparency or for vacuum molding.

As described above, the acrylic resin film according to the present invention can be used as an optical film. In this case, particularly when used as a polarizer protective film, the acrylic resin film preferably has small optical anisotropy. Particularly, the acrylic resin film preferably has small optical anisotropy not only in its in-plane directions (length direction, width direction) but also in its thickness direction. In other words, the in-plane phase difference and the absolute value of the thickness-direction phase difference of the acrylic resin film are both preferably small. More specifically, the in-plane phase difference is preferably 10 nm or less, more preferably 6 nm or less, even more preferably 5 nm or less. Further, the absolute value of the thickness-direction phase difference is preferably 50 nm or less, more preferably 20 nm or less, even more preferably 10 nm or less. The acrylic resin film having such phase differences is suitable for use as a polarizer protective film of a polarizer in a liquid crystal display device. On the other hand, if the in-plane phase difference of the film exceeds 10 nm or the absolute value of the thickness-direction phase difference of the film exceeds 50 nm, there is a case where, when the acrylic resin film according to the present invention is used as a polarizer protective film of a polarizer in a liquid crystal display device, a problem such as reduction in the contrast of the liquid crystal display device occurs.

A phase difference is an index value calculated based on birefringence, and the birefringence of an optical film includes "orientation birefringence" attributable mainly to the orientation of main chains and "photoelastic birefringence" attributable to stress. The sign of orientation birefringence and the sign of photoelastic birefringence are derived from the chemical structure of a polymer, and polymers have their respective intrinsic orientation birefringence and photoelastic birefringence.

Orientation birefringence is generally caused by the orientation of main chains of a linear polymer (polymer chain), and the orientation of main chains occurs during, for example, a process involving the flowing of a material, such as the process of extrusion molding or stretching in the production of a polymer film or the process of injection molding often used in the production of optical members with various shapes, and is fixed and remains in an optical member.

On the other hand, photoelastic birefringence is caused by elastic deformation (distortion) of a polymer. In the case of an optical member using a polymer, elastic deformation (distortion) occurs and remains in its material due to, for example, volume contraction caused by cooling to a temperature close to the glass transition temperature of the polymer or less, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient $\gamma$ of $\Delta\sigma$ at the time when a birefringence difference $\Delta n$ is caused by a stress difference $\Delta\sigma$.

$$\Delta n = \gamma \Delta \sigma$$

It can be said that a resin whose orientation birefringence and photoelastic constant based on photoelastic birefringence are sufficiently small is suitable as a material for optics applications.

An in-plane phase difference (Re) and a thickness-direction phase difference (Rth) can be calculated by the following formulas, respectively. In the case of an ideal film that is completely optically isotropic in three-dimensional directions, its in-plane phase difference Re and thickness-direction phase difference Rth are both 0.

$$Re = (nx - ny) \times d$$

$$Rth = ((nx + ny)/2 - nz) \times d$$

In the above formulas, nx, ny, and nz represent refractive indexes in X, Y, and Z axis directions, respectively, at the time when a direction in which an in-plane refractive index becomes maximum is defined as an X axis, a direction orthogonal to the X axis is defined as a Y axis, and the thickness direction of a film is defined as a Z axis. Further, d represents the thickness of the film and nx−ny represents orientation birefringence.

EXAMPLES

The present invention will be described more specifically with reference to the following examples, but is not limited to these examples. The terms "part(s)" and "%" as used hereinafter refer to "part(s) by weight" and "% by weight", respectively, unless otherwise specified.

(Average Particle Size)

The average particle size of alkyl acrylate-based cross-linked elastic particles (B) was measured as a volume average particle size by a light-scattering method using a particle size analyzer (MICROTRAC UPA150 manufactured by LEED & NORTHRUP INSTRUMENT).

(Imidization Ratio)

The imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1720 cm$^{-1}$ (Abs ester) and the absorption intensity of imide carbonyl groups at 1660 cm$^{-1}$ (Abs imide) were determined, and the ratio between them was determined as the imidization ratio (Im % (IR)). Here, the term "imidization ratio" refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit, such as a glutarimide unit or an ester unit, contained in the resin (mol %), and the monomer unit content (mol %) was converted to a monomer unit content (wt %) using the molecular weight of each monomer unit.

(Acid Value)

An acid value was calculated by a titration method described in JP-A-2005-23272.

(Refractive Index)

Each composition was processed into a sheet, and the refractive index of the sheet was measured using a high-accuracy Abbe refractometer manufactured by ATAGO Co., Ltd.

(Glass Transition Temperature)

The glass transition temperature of each composition was determined by a midpoint method based on measurement using a differential scanning calorimeter DSC-50 manufactured by Shimadzu Corporation in a nitrogen atmosphere at a temperature rise rate of 20° C./min.

(Haze Value)

The haze value of a film was measured by a method specified in JIS K7105 using NDH-300A manufactured by Nippon Denshoku Industries Co., Ltd.

(Bending Resistance)

The bending resistance of a film was evaluated in the following manner. A test piece of 2 cm×2 cm was cut out from the film in an atmosphere of 23° C. and bent 180 degrees at its center in one second in a direction perpendicular to the MD direction of the film, and was then observed to evaluate the extent of breakage of the film according to the following criteria:

A: the film was not broken;
B: the film was cracked; and
C: the film was broken.

(MIT Strength)

A film sample was subjected to stretching under conditions that will be described later to prepare a biaxially-stretched film. When the film sample was stretchable, its MIT strength was measured by a method specified in JIS C5016 using an MIT-type folding endurance tester manufactured by Toyo Seiki Seisaku-Sho, Ltd. The measurement was performed under the conditions of R=0.38 and a load of 100 g.

(Stretchability)

A film sample to be evaluated was subjected to stretching using a biaxial stretching machine 11A7 manufactured by Imoto Machinery Co., Ltd. in an atmosphere of a temperature 5° C. higher than its glass transition temperature, and its stretchability was evaluated according to the following criteria, based on whether or not it was stretched to 1.8 times in both length and width directions:

A: stretchable; and
C: non-stretchable.

(Film Thickness)

The film thickness of a stretched film was measured using a digimatic indicator (manufactured by Mitsutoyo Corporation).

(In-plane phase difference Re and thickness-direction phase difference Rth)

A test piece of 40 mm×40 mm was cut out from a film. The in-plane phase difference Re of the test piece was measured using an automatic birefringence meter (KOBRA-WR manufactured by Oji Scientific Instruments) at a temperature of 23±2° C., a humidity of 50±5%, a wavelength of 590 nm, and an incident angle of 0°.

Three-dimensional refractive indexes nx, ny, and nz were determined from the thickness d of the test piece measured by a digimatic indicator (manufactured by Mitsutoyo Corporation), the refractive index n of the test piece measured by an Abbe refractometer (3T manufactured by ATAGO Co., Ltd.), the in-plane phase difference Re of the test piece measured by an automatic birefringence meter at a wavelength of 590 nm, and the phase difference value of the test piece in a 40° inclined direction to calculate the thickness-direction phase difference of the test piece using the formula: $Rth=((nx+ny)/2-nz)\times d$.

(Vacuum Moldability)

When the surface temperature of a film reached 150° C., the film was subjected to vacuum molding using a mold having a length of 10 cm, a width of 10 cm, and a height of 5 cm. The same operation was repeated 5 times to obtain molded articles, and the molded articles were observed to determine whether or not breakage occurred and evaluation was made according to the following criteria:

A: no breakage occurred all five times;
B: breakage occurred once; and
C: breakage occurred all five times.

(Fish-Eyes)

Foreign objects (fish-eyes) having a size of 0.5 square millimeter or more in the surface of an A4-size film sample were counted using a dirt comparison chart published by Ministry of Finance in Japan, and evaluation was made according to the following criteria:

A: 5 fish-eyes or less;
B: 6 to 10 fish-eyes; and
C: 11 fish-eyes or more.

(Orientation Birefringence)

A test piece was cut out from a film, and the orientation birefringence of the test piece was measured using an automatic birefringence meter (KOBRA-WR manufactured by Oji Scientific Instruments) at a temperature of 23±2° C., a humidity of 50±5%, and a wavelength of 590 nm.

(Photoelastic Constant)

A strip test piece of 15 mm×70 mm was cut out from a film along the TD direction of the film. The birefringence of the test piece was measured using an automatic birefringence meter (KOBRA-WR manufactured by Oji Scientific Instruments) at a temperature of 23±2° C., a humidity of 50±5%, and a wavelength of 590 nm. More specifically, the birefringence was measured in a state where one end of the film was fixed while a load applied to the other end of the film was increased from 0 to 4 kgf in increments of 0.5 kgf. Based on obtained results, stress was plotted on a horizontal axis and the birefringence was plotted on a vertical axis, and the slope of a straight line obtained by the method of least squares was defined as a photoelastic constant.

Production Example 1

Synthesis of Glutarimide Acrylic Resin (G1)

A glutarimide acrylic resin (G) was produced using methyl polymethacrylate as a raw material resin and monomethylamine as an imidization agent.

In this production, a tandem-type reactive extruder was used, in which two extrusion reactors were arranged in series. The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by Kubota Corporation). The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder. The resin (strand) discharged from the second extruder was cooled on a cooling conveyor and cut into pellets by a pelletizer. In order to adjust the pressure in the part connecting the resin discharge port of the first extruder and the raw material supply port of the second extruder or to detect unstable extrusion, resin-pressure meters were provided at the discharge port of the first extruder, the center of the part connecting the first and second extruders, and the discharge port of the second extruder.

In the first extruder, an imide resin intermediate 1 was produced using a polymethyl methacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts with respect to 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts with respect to 100 parts of the raw material resin. Further, the esterification agent was removed through a vent, and then the resin was extruded through a strand die, cooled in a water tank, and pelletized by a pelletizer to obtain a glutarimide acrylic resin (G1).

The obtained glutarimide acrylic resin (G1) is a glutarimide acrylic resin (G) obtained by copolymerization of a glutarimide unit represented by the general formula (1) and a (meth)acrylate ester unit represented by the general formula (2).

The imidization ratio, glutarimide unit content, acid value, glass transition temperature, and refractive index of the glutarimide acrylic resin (G1) were measured by the above-described methods. As a result, the glutarimide acrylic resin (G1) had an imidization ratio of 13%, a glutarimide unit content of 7 wt %, an acid value of 0.4 mmol/g, a glass transition temperature of 130° C., and a refractive index of 1.50.

Production Example 2

Synthesis of Glutarimide Acrylic Resin (G2)

A glutarimide acrylic resin (G) was produced using a methyl methacrylate-styrene copolymer (styrene content: 11 mol %) as a raw material resin and monomethylamine as an imidization agent.

As an extruder, an intermeshing co-rotating twin screw extruder having a caliber of 15 mm was used. The preset temperature of each temperature control zone of the extruder was 230° C. and the screw rotation speed of the extruder was 150 rpm. The methyl methacrylate-styrene copolymer was supplied at 2 kg/hr, and the resin was melted in a kneading block to fill the kneading block with the melted resin, and then monomethylamine (manufactured by Mitsubishi Gas Chemical Company, Inc.) was injected through a nozzle in an amount of 25 parts with respect to 100 parts of the resin. The end of a reaction zone was equipped with a reverse flight so that the reaction zone was filled with the resin. The pressure in a vent port was reduced to −0.092 MPa to remove a by-product of a reaction and excess monomethylamine. The resin extruded as a strand through a die provided at the outlet port of the extruder was cooled in a water tank and then pelletized by a pelletizer to obtain a glutarimide acrylic resin (G2').

Then, an intermeshing co-rotating twin screw extruder having a caliber of 15 mm was used, and the preset temperature of each temperature control zone of the extruder was 230° C. and the screw rotation speed of the extruder was 150 rpm. The glutarimide acrylic resin (G2') obtained from a hopper was supplied to the extruder at 1 kg/hr, and the resin was melted in a kneading block to fill the kneading block with the melted resin, and then a mixed liquid of 0.8 part of dimethyl carbonate and 0.2 part of triethylamine with respect to 100 parts of the resin was injected through a nozzle to reduce carboxyl groups in the resin. The end of a reaction zone was equipped with a reverse flight so that the reaction zone was filled with the resin. The pressure in a vent port was reduced to −0.092 MPa to remove a by-product of a reaction and excess dimethyl carbonate. The resin extruded as a strand through a die provided at the outlet port of the extruder was cooled in a water tank and then pelletized by a pelletizer to obtain a glutarimide acrylic resin (G2) having a reduced acid value.

The glutarimide acrylic resin (G2) had an imidization ratio of 70%, a glutarimide unit content of 70 wt %, an acid value of 0.2 mmol/g, and a glass transition temperature of 140° C., and a refractive index of 1.53.

Production Example 3

Production of (Meth)Acrylic Resin F1-1

The following materials were fed into a polymerization apparatus having a capacity of 8 liters and equipped with a stirrer.

| | |
|---|---|
| Deionized water | 200 parts |
| Sodium dioctyl sulfosuccinate | 0.25 part |
| Sodium formaldehyde sulfoxylate | 0.15 part |
| Disodium ethylenediamine tetraacetate | 0.005 part |
| Ferrous sulfate | 0.0015 part |

Air in the polymerization apparatus was sufficiently purged with nitrogen gas so that there was virtually no oxygen in the polymerization apparatus. Then, the temperature in the polymerization apparatus was adjusted to 60° C., and 45 parts of a monomer mixture (butyl acrylate: 90 wt %, methyl methacrylate: 10 wt %) for alkyl acrylate-based cross-linked elastic particles (B), 3.1 parts of allyl methacrylate, and 0.2 part of cumene hydroperoxide shown in Table 1 were continuously added at a rate of 10 parts/hr. After the completion of the addition, polymerization was further continued for 0.5 hr to obtain alkyl acrylate-based cross-linked elastic particles (B). The polymerization conversion ratio was 99.5%, and the particles (B) had an average particle size of 75 nm.

Then, 0.3 part of sodium dioctyl sulfosuccinate was fed and the temperature in the polymerization apparatus was adjusted to 60° C., and then 55 parts of a monomer mixture (E), 0.2 part of t-dodecyl mercaptan, and 0.2 part of cumene hydroperoxide shown in Table 1 were added continuously at a rate of 10 parts/hr. Polymerization was further continued for 1 hour to obtain a latex. The polymerization conversion ratio was 99.0%. The obtained latex was salted-out with a magnesium sulfate solution, coagulated, washed with water, and dried to obtain a resin powder F1-1 of (meth)acrylic resin (F).

Production Example 4

Production of (Meth)Acrylic Resin F1-2

Polymerization was performed in the same manner as in Production Example 3 using alkyl acrylate-based cross-linked elastic particles (B) with a composition shown in Table 1 and a monomer mixture (E) with a composition shown in Table 1. The obtained latex was coagulated, washed with water, and dried to obtain a resin powder F1-2 of (meth)acrylic resin (F). However, the average particle size of the alkyl acrylate-based cross-linked elastic particles (B) was adjusted to 40 nm.

Production Example 5

Production of (Meth)Acrylic Resin F1-4

Polymerization was performed in the same manner as in Production Example 3 using alkyl acrylate-based cross-linked elastic particles (B) with a composition shown in Table 1 and a monomer mixture (E) with a composition shown in Table 1. The obtained latex was coagulated, washed with water, and dried to obtain a resin powder F1-4 of (meth)acrylic resin (F). As in the case of Production Example 3, the average particle size of the alkyl acrylate-based cross-linked elastic particles (B) was adjusted to 75 nm.

Comparative Production Example 1

Production of (Meth)Acrylic Resin F1-3

Polymerization was performed in the same manner as in Production Example 3 using alkyl acrylate-based cross-linked elastic particles (B) with a composition shown in Table 1 and a monomer mixture (E) with a composition shown in Table 1. The obtained latex was coagulated, washed with water, and dried to obtain a resin powder F1-3 of (meth)acrylic resin (F). However, the average particle size of the alkyl acrylate-based cross-linked elastic particles (B) was adjusted to 120 nm.

Comparative Production Example 2

Production of (Meth)Acrylic Resin F1-5

Polymerization was performed in the same manner as in Production Example 3 using alkyl acrylate-based cross-linked elastic particles (B) with a composition shown in Table 1 and a monomer mixture (E) with a composition shown in Table 1. The obtained latex was coagulated, washed with water, and dried to obtain a resin powder F1-5 of (meth)acrylic resin (F). However, the average particle size of the alkyl acrylate-based cross-linked elastic particles (B) was adjusted to 120 nm.

TABLE 1

| | | (Meth)acrylic resin (F) | | | | |
|---|---|---|---|---|---|---|
| | | F1-1 | F1-2 | F1-3 | F1-4 | F1-5 |
| Alkyl acrylate-based cross-linked elastic particles (B) | Monofunctional monomer content of (F) (parts) | 45 | 35 | 55 | 45 | 55 |
| | Butyl acrylate (%) | 90 | 90 | 90 | 90 | 82 |
| | Methyl methacrylate (%) | 10 | 10 | 10 | 10 | 0 |
| | Styrene (%) | 0 | 0 | 0 | 0 | 18 |
| | Allyl methacrylate (parts) | 1.5 | 1.5 | 1.5 | 1.5 | 1.5 |
| | Cumene hydroperoxide (part) | 0.1 | 0.1 | 0.1 | 0.1 | 0.1 |
| Average particle size of (B) (nm) | | 75 | 40 | 120 | 75 | 120 |
| Monomer mixture (E) | Monofunctional monomer content of (F) (parts) | 55 | 65 | 45 | 55 | 45 |
| | Methyl methacrylate (%) | 72 | 72 | 72 | 90 | 90 |
| | Methacrylic acid (%) | 16 | 16 | 16 | 0 | 0 |
| | Butyl acrylate (%) | 12 | 12 | 12 | 10 | 10 |
| | t-dodecyl mercaptan (part) | 0.2 | 0.2 | 0.2 | 0.2 | 0.2 |
| | Cumene hydroperoxide (part) | 0.2 | 0.2 | 0.2 | 0.2 | 0.2 |

Examples 1 to 12

An intermeshing co-rotating twin screw extruder having a caliber of 30 mm was used, and the preset temperature of temperature control zone of the extruder was 240° C. and the screw rotation speed of the extruder was 250 rpm. A mixture of the glutarimide acrylic resin (G1) or (G2) and the (meth) acrylic resin (F) shown in Table 2 was supplied at a rate of 10 kg/hr. The resin extruded as a strand through a die provided at the outlet port of the extruder was cooled in a water tank and pelletized by a pelletizer to obtain pellets.

The obtained pellets were supplied at a rate of 10 kg/hr to a melt extruder whose outlet port was connected to a T-die, the temperature control zone preset temperature of the extruder was 280° C., and the screw rotation speed of the extruder was 100 rpm, and a film having a film thickness shown in Table 2 was obtained by melt extrusion. Various physical properties of the film were evaluated.

Comparative Examples 1 to 10

A film having a film thickness shown in Table 3 was obtained in the same manner as in Examples 1 to 12 from a mixture of the glutarimide acrylic resin (G1) or (G2) or an acrylic resin (polymethyl methacrylate manufactured by Sumitomo Chemical Co., Ltd. under the trade name of "SUMIPEX LG") and the (meth)acrylic resin (F) shown in Table 3. Various physical properties of the film were evaluated.

Example 13

The film obtained in Example 1 was stretched to 1.8 times in a length direction and to 1.8 times in a width direction at a temperature higher by 5° C. than the glass transition temperature of the film, and various physical properties of the stretched film were measured.

Example 14

The film obtained in Example 2 was stretched in the same manner as in Example 13 to obtain a stretched film, and various physical properties of the stretched film were measured.

Example 15

The film obtained in Example 3 was stretched in the same manner as in Example 13 to obtain a stretched film, and various physical properties of the stretched film were measured.

Example 16

The film obtained in Example 4 was stretched in the same manner as in Example 13 to obtain a stretched film, and various physical properties of the stretched film were measured.

Example 17

The film obtained in Example 8 was stretched in the same manner as in Example 13 to obtain a stretched film, and various physical properties of the stretched film were measured.

Example 18

The film obtained in Example 9 was stretched in the same manner as in Example 13 to obtain a stretched film, and various physical properties of the stretched film were measured.

Example 19

The film obtained in Example 10 was stretched in the same manner as in Example 13 to obtain a stretched film, and various physical properties of the stretched film were measured.

Example 20

An intermeshing co-rotating twin screw extruder having a caliber of 30 mm was used, and the preset temperature of temperature control zone of the extruder was 240° C. and the screw rotation speed of the extruder was 250 rpm. A mixture of the glutarimide acrylic resin (G1) and the (meth)acrylic resin (F) shown in Table 5 was supplied at a rate of 10 kg/hr. The resin extruded as a strand through a die provided at the outlet port of the extruder was cooled in a water tank and pelletized by a pelletizer to obtain pellets.

The obtained pellets were supplied at a rate of 10 kg/hr to a melt extruder whose outlet port was connected to a T-die, the temperature control zone preset temperature of the extruder was 280° C., and the screw rotation speed of the extruder was 100 rpm, and a film having a film thickness shown in Table 5 was obtained by melt extrusion. Various physical properties of the film were evaluated.

Comparative Example 11

The film obtained in Comparative Example 1 was stretched in the same manner as in Example 13 to obtain a stretched film, and various physical properties of the stretched film were measured.

Comparative Example 12

The film obtained in Comparative Example 2 was stretched in the same manner as in Example 13 to obtain a stretched film, and various physical properties of the stretched film were measured.

Comparative Example 13

The film obtained in Comparative Example 3 was stretched in the same manner as in Example 13 to obtain a stretched film, and various physical properties of the stretched film were measured.

Comparative Example 14

The film obtained in Comparative Example 8 was stretched in the same manner as in Example 13 to obtain a stretched film, and various physical properties of the stretched film were measured.

Comparative Example 15

The film obtained in Comparative Example 9 was stretched in the same manner as in Example 13 to obtain a stretched film, and various physical properties of the stretched film were measured.

Comparative Examples 16 to 20

A film having a film thickness shown in Table 5 was obtained in the same manner as in Examples 1 to 12 from a mixture of the glutarimide acrylic resin (G1) or an acrylic resin (polymethyl methacrylate manufactured by Sumitomo Chemical Co., Ltd. under the trade name of "SUMIPEX EX") and the (meth)acrylic resin (F) shown in Table 5. Various physical properties of the film were evaluated.

The mixing ratio of each component in each of the mixtures used in Examples and Comparative Examples and the evaluation results of various physical properties of each of the films obtained in Examples and Comparative Examples are shown in the following Tables 2 to 5.

TABLE 2

| | | Examples | | | | | | | | | | | |
| --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 |
| Glutarimide acrylic resin (G1) | (parts) | 60 | 40 | 80 | 85 | 60 | 60 | 60 | 40 | 60 | 85 | 0 | 0 |
| Glutarimide acrylic resin (G2) | (parts) | 0 | 0 | 0 | 0 | 0 | 0 | 0 | 0 | 0 | 0 | 85 | 40 |
| (Meth)acrylic resin (F) | | F1-1 | F1-1 | F1-1 | F1-1 | F1-1 | F1-1 | F1-1 | F1-2 | F1-2 | F1-2 | F1-1 | F1-1 |
| | (parts) | 40 | 60 | 20 | 15 | 40 | 40 | 40 | 60 | 40 | 15 | 15 | 60 |

TABLE 2-continued

|  |  |  | Examples | | | | | | | | | | | |
| --- | --- | --- | --- | --- | --- | --- | --- | --- | --- | --- | --- | --- | --- | --- |
|  |  |  | 1 | 2 | 3 | 4 | 5 | 6 | 7 | 8 | 9 | 10 | 11 | 12 |
| Physical Properties of Film | Film thickness | (μm) | 100 | 100 | 100 | 100 | 100 | 20 | 300 | 100 | 100 | 100 | 100 | 100 |
|  | Glass transition temperature | (° C.) | 125 | 124 | 128 | 129 | 125 | 125 | 125 | 124 | 125 | 128 | 135 | 122 |
|  | Haze value | (%) | 0.4 | 0.4 | 0.5 | 0.3 | 0.4 | 0.4 | 0.4 | 0.4 | 0.3 | 0.4 | 1.1 | 1.5 |
|  | Bending resistance |  | A | A | A | A | A | A | A | A | A | A | B | B |
|  | Stretchability |  | A | A | A | A | A | A | A | A | A | A | A | A |
|  | Vacuum moldability |  | A | A | A | A | A | A | A | A | A | A | B | B |
|  | Fish-eyes |  | A | A | A | A | A | A | A | A | A | A | B | B |

TABLE 3

|  |  | Comparative Examples | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Glutarimide acrylic resin (G1) | (parts) | 40 | 85 | 60 | 0 | 0 | 0 | 0 | 100 | 0 | 0 |
| Glutarimide acrylic resin (G2) | (parts) | 0 | 0 | 0 | 0 | 0 | 0 | 0 | 0 | 0 | 100 |
| Acrylic resin (SUMIPEX LG) | (parts) | 0 | 0 | 0 | 40 | 60 | 85 | 90 | 0 | 100 | 0 |
| (Meth)acrylic resin (F) |  | F1-3 | F1-3 | F1-3 | F1-1 | F1-1 | F1-1 | F1-1 | — | — | — |
|  | (parts) | 60 | 15 | 40 | 60 | 40 | 15 | 10 | 0 | 0 | 0 |
| Physical Properties of Film | Film thickness (μm) | 100 | 100 | 400 | 100 | 100 | 100 | 100 | 100 | 100 | 100 |
|  | Glass transition temperature (° C.) | 115 | 118 | 119 | 105 | 106 | 111 | 112 | 130 | 107 | 140 |
|  | Haze value (%) | 1.8 | 1.5 | 1.4 | 1.5 | 1.4 | 1.5 | 1.3 | 0.3 | 0.4 | 0.8 |
|  | Bending resistance | A | A | A | A | A | A | C | C | C | C |
|  | Stretchability | A | A | C | A | A | A | A | A | A | A |
|  | Vacuum moldability | A | A | C | A | A | A | C | C | C | C |
|  | Fish-eyes | C | C | C | C | C | C | C | A | A | A |

TABLE 4

|  |  |  | Examples | | | | | | | Comparative Examples | | | | |
| --- | --- | --- | --- | --- | --- | --- | --- | --- | --- | --- | --- | --- | --- | --- |
|  |  |  | 13 | 14 | 15 | 16 | 17 | 18 | 19 | 11 | 12 | 13 | 14 | 15 |
| Glutarimide acrylic resin (G1) | (parts) |  | 60 | 40 | 80 | 85 | 40 | 60 | 85 | 40 | 85 | 60 | 100 | 0 |
| Acrylic resin (SUMIPEX LG) | (parts) |  | 0 | 0 | 0 | 0 | 0 | 0 | 0 | 0 | 0 | 0 | 0 | 100 |
| (Meth)acrylic resin (F) |  |  | F1-1 | F1-1 | F1-1 | F1-1 | F1-2 | F1-2 | F1-2 | F1-3 | F1-3 | F1-3 | — | — |
|  | (parts) |  | 40 | 60 | 20 | 15 | 60 | 40 | 15 | 60 | 15 | 40 | 0 | 0 |
| Physical Properties of Film | Film thickness | (μm) | 31 | 31 | 31 | 31 | 31 | 31 | 31 | 31 | 31 | 31 | 31 | 31 |
|  | Glass transition temperature | (° C.) | 125 | 124 | 128 | 129 | 124 | 125 | 128 | 115 | 118 | 119 | 130 | 107 |
|  | Haze value | (%) | 0.2 | 0.2 | 0.3 | 0.2 | 0.2 | 0.2 | 0.2 | 0.9 | 0.8 | 0.7 | 0.2 | 0.2 |
|  | Bending resistance |  | A | A | A | A | A | A | A | A | A | A | A | A |
|  | MIT strength | Number of times | 4200 | 4150 | 3110 | 3060 | 4020 | 3940 | 3350 | 2460 | 2240 | 2310 | 1680 | 1450 |
|  | In-plane phase difference Re | nm | 1 | 1 | 1 | 1 | 1 | 1 | 1 | 1 | 1 | 1 | 1 | 2 |
|  | Thickness-direction phase difference Rth | nm | −2 | −3 | −2 | −1 | −3 | −2 | −1 | −3 | −1 | −1 | 2 | −8 |
|  | Vacuum moldability |  | A | A | A | A | A | A | A | A | C | C | C | C |
|  | Fish-eyes |  | A | A | A | A | A | A | A | C | C | C | A | A |

As shown in Tables 2 to 4, the acrylic resin films obtained in Examples 1 to 19 have high heat resistance due to their high glass transition temperature of 120° C. or higher, high transparency due to their low haze value, excellent flexibility due to their excellent bending resistance, less fish-eyes, excellent stretchability, and excellent vacuum moldability. In addition to that, as can be seen from Table 4, the stretched films obtained in Examples 13 to 19 have very small optical anisotropy in both in-plane and thickness directions.

TABLE 5

|  |  |  | Examples | Comparative Examples | | | | |
|---|---|---|---|---|---|---|---|---|
|  |  |  | 20 | 16 | 17 | 18 | 19 | 20 |
| Glutarimide acrylic resin (G1) | | (parts) | 60 | 85 | 0 | 0 | 100 | 0 |
| Acrylic resin (SUMIPEX EX) | | (parts) | 0 | 0 | 60 | 85 | 0 | 100 |
| (Meth)acrylic resin (F) | | | F1-4 | F1-5 | F1-4 | F1-5 | — | — |
|  |  | (parts) | 40 | 15 | 40 | 15 | — | — |
| Physical Properties of Film | Film thickness | (μm) | 100 | 100 | 100 | 100 | 100 | 100 |
|  | Glass transition temperature | (° C.) | 120 | 122 | 102 | 104 | 130 | 110 |
|  | Haze value | (%) | 0.4 | 0.5 | 0.3 | 0.4 | 0.3 | 0.3 |
|  | Bending resistance | | A | A | A | A | C | C |
|  | Stretchability | | A | A | A | A | A | A |
|  | Vacuum moldability | | A | A | A | A | C | C |
|  | Fish-eyes | | A | C | A | A | A | A |
|  | Orientation birefringence ($\times 10^{-4}$) | | −0.09 | — | −0.18 | −0.21 | 0.04 | −0.30 |
|  | Photoelastic constant ($\times 10^{-12}$) | ($Pa^{-1}$) | −4.09 | — | −3.61 | −3.94 | −4.38 | −3.84 |

As shown in Table 5, the film obtained in Example 20 has high heat resistance, excellent stretchability, and excellent vacuum moldability. Further, the film has high transparency due to its low haze value and excellent flexibility due to its excellent bending resistance. Further, in Example 20, the alkyl acrylate-based cross-linked elastic particles (B) having an average particle size of less than 80 nm were used, and therefore a film having less fish-eyes was obtained in spite of the fact that the monomer mixture (E) did not contain unsaturated carboxylic acid. In addition to that, the film has a very low orientation birefringence and is found to be suitable for optics applications.

The invention claimed is:

1. An acrylic resin film obtained by molding a resin composition containing the following components (G) and (F):
a glutarimide acrylic resin (G) that contains a unit represented by the following general formula (1) and a unit represented by the following general formula (2) and has a glass transition temperature of 120° C. or higher,

[Chemical Formula 1]

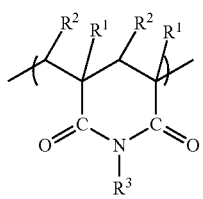

(1)

(wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or a substituent group having an aromatic ring and 5 to 15 carbon atoms)

[Chemical Formula 2]

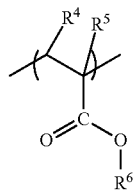

(2)

(wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or a substituent group having an aromatic ring and 5 to 15 carbon atoms); and
a (meth)acrylic resin (F) obtained by polymerization of a vinyl group-containing compound in the presence of alkyl acrylate-based cross-linked elastic particles having an average particle size of 40 nm or more and less than 80 nm and obtained by copolymerization of alkyl acrylate and another vinyl monomer copolymerizable therewith;
wherein the glutarimide acrylic resin (G) does not contain a unit represented by the following general formula (3):

[Chemical Formula 3]

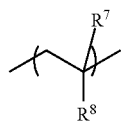

(3)

(wherein $R^7$ is hydrogen or an alkyl group having 1 to 8 carbon atoms and $R^8$ is an aryl group having 6 to 10 carbon atoms); and wherein said vinyl group-containing compound in the (meth) acrylic resin (F) is a monomer mixture (E) consisting of 60 to 100 wt % of alkyl methacrylate and 0 to 40 wt % of alkyl acrylate, or a monomer mixture (E) consisting of more than 10 wt % but 35 wt % or less of unsaturated carboxylic acid, 50 wt % or more but less than 90 wt % of alkyl methacrylate and 0 wt % or more but less than 40 wt % of alkyl acrylate.

2. The acrylic resin film according to claim 1, wherein, when an amount of the resin composition is taken as 100 wt %, an amount of the alkyl acrylate-based cross-linked elastic particles contained in the resin composition is 5 to 40 wt %.

3. The acrylic resin film according to claim 1, wherein, when an amount of the resin composition is taken as 100 wt %, amounts of the glutarimide acrylic resin (G) and the (meth)acrylic resin (F) contained in the resin composition are 40 to 90 wt % and 60 to 10 wt %, respectively.

4. The acrylic resin film according to claim 1, wherein the (meth)acrylic resin (F) is obtained by polymerization of a monomer mixture (E) consisting of 60 to 100 wt % of alkyl methacrylate and 0 to 40 wt % of alkyl acrylate in the presence of alkyl acrylate-based cross-linked elastic particles (B) having an average particle size of less than 80 nm and obtained by copolymerization of 100 parts by weight of a monomer mixture consisting of 50 to 100 wt % of alkyl acrylate and 50 to 0 wt % of alkyl methacrylate and 0.5 to 5 parts by weight of a polyfunctional monomer having two or more non-conjugated double bonds per molecule.

5. The acrylic resin film according to claim 1, wherein the (meth)acrylic resin (F) is obtained by polymerization of a monomer mixture (E) consisting of more than 10 wt % but 35 wt % or less of unsaturated carboxylic acid, 50 wt % or more but less than 90 wt % of alkyl methacrylate and 0 wt % or more but less than 40 wt % of alkyl acrylate in the presence of alkyl acrylate-based cross-linked elastic particles (B) having an average particle size of less than 80 nm and obtained by copolymerization of 100 parts by weight of a monomer mixture consisting of 50 to 100 wt % of alkyl acrylate and 50 to 0 wt % of alkyl methacrylate and 0.5 to 5 parts by weight of a polyfunctional monomer having two or more non-conjugated double bonds per molecule, and wherein an amount of the alkyl acrylate-based cross-linked elastic particles (B) contained in the (meth)acrylic resin (F) is more than 30 wt % but 60 wt % or less.

6. The acrylic resin film according to claim 1, which has a glass transition temperature of 115° C. or higher, a haze value of 1.0% or less, and a thickness of 300 μm or less.

7. An optical film comprising the acrylic resin film according to claim 1.

* * * * *